Figure 1:
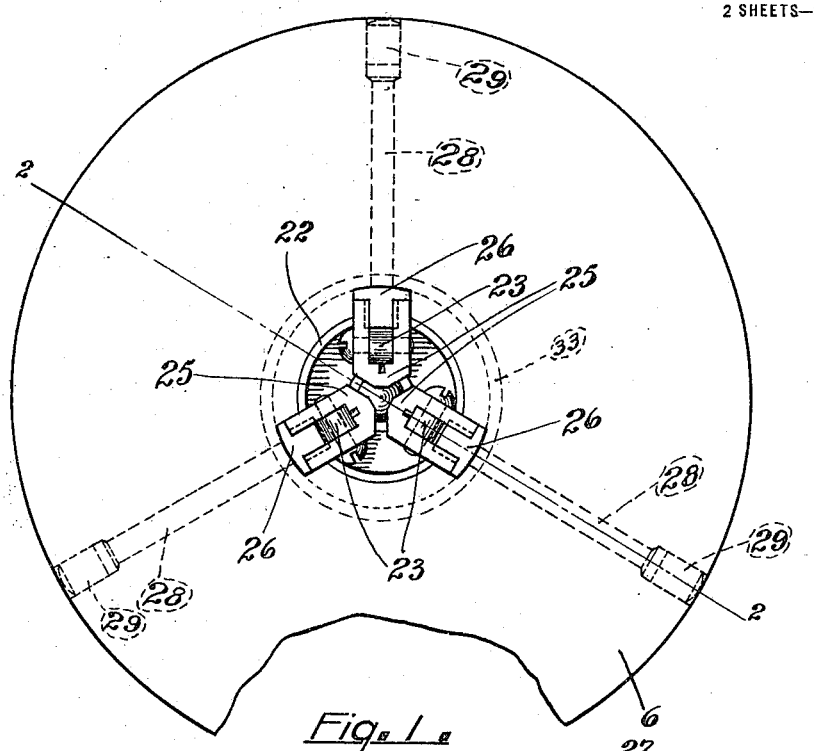

C. E. JOHNSON.
CHUCK.
APPLICATION FILED JAN. 22, 1916.

1,204,025.

Patented Nov. 7, 1916.
2 SHEETS—SHEET 1.

Inventor
Charles E. Johnson
By Moulton & Livrance
Attorneys.

C. E. JOHNSON.
CHUCK.
APPLICATION FILED JAN. 22, 1916.

1,204,025.

Patented Nov. 7, 1916.
2 SHEETS—SHEET 2.

Inventor
Charles E. Johnson
By Moulton & Livrance
Attorneys.

UNITED STATES PATENT OFFICE.

CHARLES E. JOHNSON, OF MUSKEGON, MICHIGAN.

CHUCK.

1,204,025.

Specification of Letters Patent.

Patented Nov. 7, 1916.

Application filed January 22, 1916. Serial No. 73,604.

*To all whom it may concern:*

Be it known that I, CHARLES E. JOHNSON, a citizen of the United States of America, residing at Muskegon, in the county of Muskegon and State of Michigan, have invented certain new and useful Improvements in Chucks; and I do hereby declare the following to be a full, clear, and exact description of the invention, such as will enable others skilled in the art to which it appertains to make and use the same.

This invention relates to a chuck which is adapted to be used with various mechanisms in holding articles to be machined.

It is the object and purpose of the invention to provide a chuck of this character having construction which adapts it to hold articles to be machined and which can be operated to hold or release the articles at will.

Figure 2:
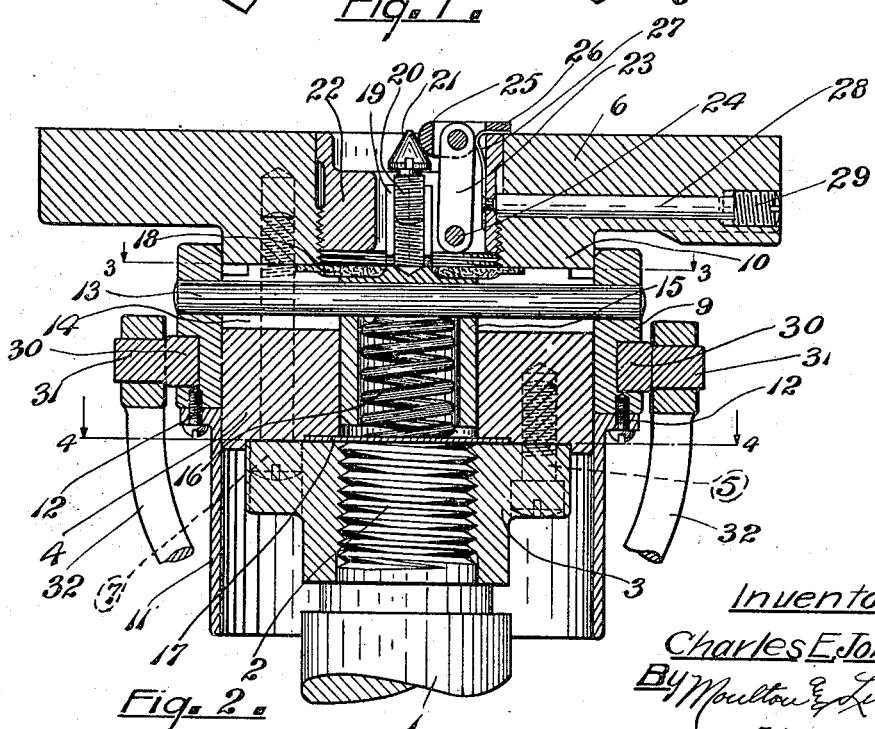
Figure 3:
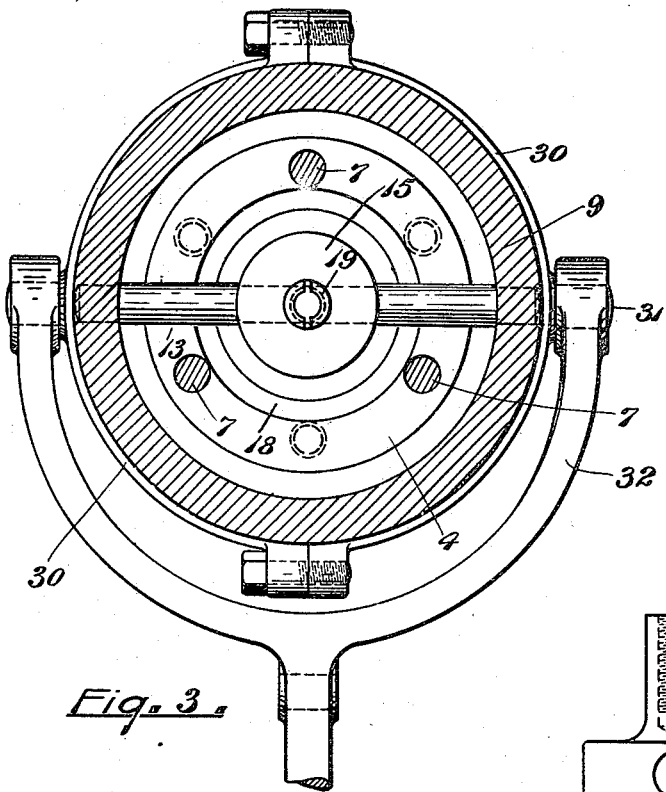
Figure 5:
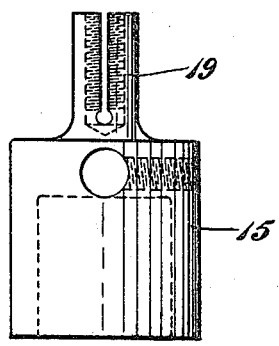
Figure 4:
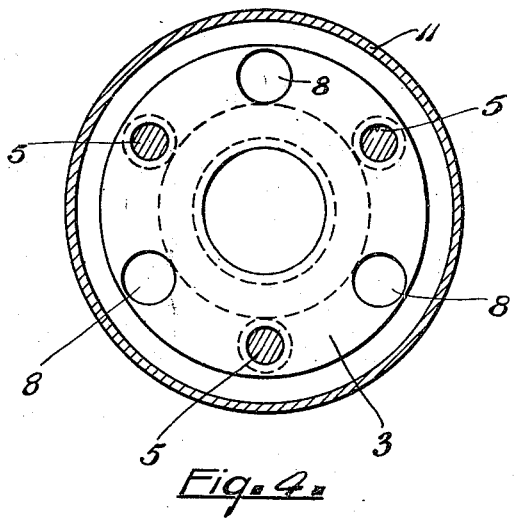

Further objects and purposes together with novel construction for attaining them will appear as understanding of the embodiment disclosed in the drawings is had, in which drawings;

Figure 1 is a plan view of the chuck. Fig. 2 is a vertical section taken substantially on the line 2—2 of Fig. 1. Figs. 3 and 4 are horizontal sections on the lines 3—3 and 4—4 of Fig. 2 respectively; and Fig. 5 is a side elevation of a detail of the plunger that forms one element of the chuck.

Like reference characters refer to like parts throughout the several views of the drawings.

The chuck construction is adapted to be attached to any suitable drive shaft 1 which at its end is provided with a screw threaded extension 2 on which is threaded a head 3. Above the head, as shown in Fig. 2, is located a cylindrical member 4, the head 3 and the member 4 being rigidly connected together by a plurality of set screws 5. Immediately above the member 4 is located a table 6, this also being of circular outline and secured to the head 3 and member 4 so as to rotate therewith by means of long set screws 7. These screws have heads passing loosely into openings 8 formed in the head 3 while the shanks of the screws pass loosely through the member 4 and thread into the underside of table 6.

Surrounding the member 4 is a ring 9 at its upper edge also partially surrounding the downwardly projecting extension 10 to the table 6. A sleeve 11 is connected to the underside of the ring 9 being attached thereto by screws 12 as shown or other suitable connections. A bar 13 extends across the ring 9 and is mounted at its ends at diametrically opposed points in this ring, a slot 14 being cut in the upper side of the member 4 to permit the passage of and the up and down movements of the bar as will later be described.

Member 4 is bored at its center to loosely receive a plunger 15 of cylindrical outline and which is interiorly bored to house a strong coiled spring 16, at its lower end resting on a plate 17 interposed between the head 3 and the member 4 while its upper end engages against bar 13, this bar passing through the upper part of the plunger as shown. Between the lower surface of the table and the upper end of the plunger any suitable buffer such as a washer 18 is interposed. A split sleeve 19 is formed integral with and projects upwardly from the head of the plunger 15 and is interiorly screw threaded to receive the screw threaded shank 20 of a plug which has a head 21 of substantially conical outline, the pointed end thereof extending in an upward direction. Table 6 is also bored at its center and screw threaded to receive the plug 22, this plug being also bored at its center to permit the passage of sleeve 19 and the plug carried thereby and furthermore being slotted at a plurality of points to receive the upright links 23 which are pivotally mounted on pins 24 at their lower ends and at their upper ends carry heads 25 substantially U-shaped in formation and having the legs thereof extending radially and outwardly from the center of the table. Clutch elements 26 are slidably mounted between the ends of said legs and are attached to springs 27 which in turn are bent inwardly to bear against the upper ends of the links 23 and then extend downwardly inside of the plug 22 being secured in place by rivets or other suitable attaching means. The plug 22 is held in position by rods 28 which pass horizontally through the table 26 below the upper surface thereof bearing against the sides of the plug and being forced thereagainst by the screws 29 which may be operated from the sides of the table 6.

The ring 9 is provided with an annular groove in which is mounted a two part ring 30, the ends of which may be fastened together in any suitable manner and which at diametrically opposed points are provided with outwardly extending studs 31, to which a yoke 32 may be attached, this yoke extending downwardly as shown in the disclosure operable in any suitable manner for drawing the ring 9 and attached mechanism in a downward direction.

While it is to be understood that this chuck may be used in various manners and may be positioned so that the face of the table 6 is located horizontally instead of vertically, I have in practice used it for holding piston rings in the operation of grinding the flat surfaces thereof. When a piston ring is to be applied to the chuck the yoke 32 is operated to pull ring 9 away from the table in a downward direction, this serving also to draw the rod 13 downwardly compressing spring 16 and lowering the conical head 21 of the plug that is carried by the split sleeve 19. When this occurs the tendency of springs 27 is to force links 23 inwardly and carry clutch elements 26 in the same direction. A piston ring may now be placed over the clutch elements and upon release of yoke 32 spring 16 elevates the conical head 21 forcing the heads 25 and attached links 23 outwardly at the same time overcoming the springs 27 and causing the clutch elements 26 to bear against the inner sides of the ring thereon, this ring being shown in dotted outline at 33 in Fig. 1. After the upper side of the ring has been ground an operation of the yoke 32 will withdraw the conical head 21 freeing the ring so that it may be turned over and ground on the opposite side on an adjacent grinder. The table 6 having a true flat surface will hold the ring absolutely true so that when a grinding wheel is passed over it the flat surfaces of the ring will be ground to a perfectly true plane.

From the foregoing it will be evident that I have provided a clutch which is of value in connection with the grinding of piston rings and which also will be of value in many other relations. It has been the practice heretofore to hold the rings on magnetic clutches as the grinding wheel passes across them but this has been found to be unsatisfactory for the reason that if the ring is slightly distorted out of a true plane the effect of the magnetic clutch is to draw it to a true plane while it is being ground but after the ring is released the flat surface thereof will assume its former distorted formation. A clutch of this kind and of the structure outlined may be rotated as freely as can any magnetic clutch and at the same time no forces are present to distort the ring in any manner, the clutch elements that engage against the interior of the ring engaging against it by spring pressure and not with any such force as to draw the ring or distort it in any manner out of the position which it will occupy before or after it is released from the clutch.

I claim:—

1. In combination, a shaft, a head detachably secured thereto, a cylindrical member fixed to the head, a table secured to the member, a ring passing around said cylindrical member, a rod supported at its ends in the ring and passing through a slot in said member, a ring having projecting lugs loosely mounted in an annular groove in the first ring, a yoke attached to the lugs, an interiorly bored plug set in the table at its center, a plurality of links each pivotally mounted at one end on the plug and having the other end extending outwardly toward the face of the table, heads pivotally connected to the free ends of said links, a spring secured to the plug back of each link, a clutch element carried by the free end of each spring immediately outside the face of the table, means to hold the plug rigidly in position in the table, a hollow plunger loosely located within the cylindrical member centrally thereof, said rod passing through one end of the plunger, a coiled spring inside the plunger positioned between the rod and said head, an interiorly threaded sleeve on the plunger extending into the bore of the plug, and a second plug threaded into said sleeve and having a conical head adapted to engage with the heads attached to the free ends of the links.

2. In combination, a shaft, a head detachably secured thereto, a member detachably secured to the head, a table secured to said member, a ring surrounding the member, means for effecting a longitudinal movement of the ring over the member, a rod seated at its ends in the ring and passing through a slot cut in the member, a hollow plunger loosely seated in a central opening in said member, said rod passing through one end of the plunger, a coiled spring housed by the plunger and located between the rod and said head, a centrally bored plug seated centrally in an opening in the table, a sleeve on the plunger extending into said plug, a second plug having a conical head adjustably mounted in the sleeve, a plurality of links mounted at one end in the first plug and extending substantially parallel to the axis of the table toward the face thereof, a head secured to the free end of each link bearing against the conical head of the second plug, a spring attached to the first plug back of each link, and a clutch element attached to the free end of each spring, said element being located so as to pass over the faces of the first plug and table.

3. In combination, a shaft, a head thereon, a member secured to the head, a table secured to said member, a hollow plunger loosely seated in an opening formed centrally in said member, a rod passing through one end of the plunger and through a slot cut in the member, a spring housed in the plunger between the rod and the head, means connected to the ends of the rod for moving the plunger against the force of the spring, a plug having a central opening seated centrally in the table, an extension to the plunger passing into the plug, a member having a conical head adjustably mounted on said extension, heads loosely mounted on the plug around the conical head, leaf springs connected at one end to the plug, one for each head and normally tending to press the heads against said conical head, and a clutch element connected to the free end of each leaf spring and disposed over the face of the plug and table about the center thereof.

4. In combination, a shaft, a head thereon, a member secured to the head, a table secured to the member, a hollow plunger loosely mounted in a central opening in said member, a spring housed by the plunger between the end thereof and the head, means to move the plunger toward the head against the force of the spring, an extension to the plunger, a member having a conical head on the extension, said extension and member passing into a central opening in the table, clutch elements mounted to pass over the face of the table and around the center thereof, means normally tending to move said elements inwardly toward the center of the table, and means interposed between the conical head and said elements whereby in the normal position of the head they are forced outwardly away from the center of the table, substantially as described.

5. In combination, a shaft, a head thereon, a table connected to rotate with the head, a plunger movably mounted between the table and head and carrying a second head having diverging sides located centrally in an opening through the table, means to operate the plunger toward the table, means connected with the plunger to operate it in opposite direction, clutch elements mounted on the table around said second head and movable over the face of the table, means normally operating said elements inwardly toward said second head, and means engaging against the diverging side of said head and interposed between said head and said elements for forcing them outwardly when the head occupies its normal position, substantially as described.

6. In combination, a head adapted to be attached to the end of a driven shaft, a table detachably connected to the head, said table having a central opening, a spring operated plunger interposed between the head and table, a member having a second head provided with diverging sides adjustably secured to the first head and extending into the opening in the table, clutch elements positioned around said second head there being operative engagement between the diverging sides of said second head and the clutch elements for forcing said elements outwardly over the face of the table when the head occupies its normal position, means tending to carry said elements inwardly, and means for moving the plunger and attached head against the force of the spring operating the plunger to thereby free the clutch elements for inward movement, substantially as described.

7. In combination, a table mounted for rotation, said table having a central opening therethrough, clutch elements around said opening and mounted to move over the face of the table, means tending to carry said elements inwardly toward the center of the table, spring operated mechanism mounted adjacent and on the table for forcing said elements outwardly and operator controlled means for rendering said mechanism inoperative, substantially as described.

8. In combination, a table mounted for rotation, said table having a central opening therethrough, clutch elements mounted about said opening, means normally moving said clutch elements toward the center of the opening, means extending upwardly in said opening normally forcing said elements outwardly over the face of the table, and operator controlled means for retracting said last means to permit the inward movement of said clutch elements, substantially as described.

In testimony whereof I affix my signature.

CHARLES E. JOHNSON.

Witnesses:
CHRIS SCHRIER,
GEORGE D. VANDERWERP.

Copies of this patent may be obtained for five cents each, by addressing the "Commissioner of Patents, Washington, D. C."